(12) United States Patent
Erickson et al.

(10) Patent No.: US 10,137,638 B2
(45) Date of Patent: Nov. 27, 2018

(54) METHOD OF BONDING FIBERS TO FORM A COMPOSITE STRUCTURE

(71) Applicant: Indemnis, Inc., Anchorage, AK (US)

(72) Inventors: Alan Erickson, Anchorage, AK (US); Mackinzie Banbury, Wasilla, AK (US)

(73) Assignee: INDEMNIS, INC., Anchorage, AK (US)

( * ) Notice: Subject to any disclaimer, the term of this patent is extended or adjusted under 35 U.S.C. 154(b) by 0 days.

(21) Appl. No.: 15/847,105

(22) Filed: Dec. 19, 2017

(65) Prior Publication Data

US 2018/0104902 A1     Apr. 19, 2018

Related U.S. Application Data

(63) Continuation of application No. PCT/US2017/048722, filed on Aug. 25, 2017.
(Continued)

(51) Int. Cl.
*B29C 65/04*     (2006.01)
*B29C 65/48*     (2006.01)
(Continued)

(52) U.S. Cl.
CPC .......... *B29C 65/04* (2013.01); *B29C 65/4815* (2013.01); *B29C 65/4855* (2013.01); *B29C 65/5057* (2013.01); *B29C 65/72* (2013.01); *B29C 66/006* (2013.01); *B29C 66/1122* (2013.01); *B29C 66/43* (2013.01); *B29C 66/71* (2013.01); *B29C 66/729* (2013.01); *B29C 66/7294* (2013.01); *B29C 66/73115* (2013.01); *B29C 66/73143* (2013.01); *B29C 66/73921* (2013.01); *B29C 66/8322* (2013.01); *B32B 5/02* (2013.01); *B32B 5/022* (2013.01); *B32B 5/26* (2013.01); *B32B 7/04* (2013.01); *B32B 27/08* (2013.01); *B32B 27/32* (2013.01); *B32B 27/34* (2013.01); *B32B 27/36* (2013.01);
(Continued)

(58) Field of Classification Search
CPC ..... B29C 65/04; B29C 66/7294; B32B 5/022; B32B 5/26; B32B 27/08; B32B 27/32; B32B 27/34; B32B 27/36
See application file for complete search history.

(56) References Cited

U.S. PATENT DOCUMENTS 5,976,627 A     11/1999  Wynne
9,481,144 B1 *  11/2016  Duggal .................... B32B 5/12
(Continued)

FOREIGN PATENT DOCUMENTS

CA        972274        8/1975

OTHER PUBLICATIONS

International Search Report and Written Opinion, dated Nov. 6, 2017 for corresponding International Application No. PCT/US2017/048722, 8 pages.

*Primary Examiner* — Daniel McNally
(74) *Attorney, Agent, or Firm* — Seed IP Law Group LLP

(57) ABSTRACT

A method for bonding fibers includes providing a first fiber layer and a second fiber layer positioned below the first fiber layer to bond the first fiber layer with the second fiber layer. The method may also include providing a first additive layer. The first additive layer is located between the first fiber layer and the second fiber layer. Then, the method may further include activating the first additive layer by directing energy at the first additive layer.

13 Claims, 4 Drawing Sheets

Related U.S. Application Data

(60) Provisional application No. 62/379,827, filed on Aug. 26, 2016.

(51) Int. Cl.

| | | |
|---|---|---|
| *B29C 65/50* | (2006.01) |
| *B29C 65/72* | (2006.01) |
| *B29C 65/00* | (2006.01) |
| *B32B 5/02* | (2006.01) |
| *B32B 7/04* | (2006.01) |
| *B32B 5/26* | (2006.01) |
| *B32B 27/08* | (2006.01) |
| *B32B 27/32* | (2006.01) |
| *B32B 27/34* | (2006.01) |
| *B32B 27/36* | (2006.01) |
| *B29C 65/08* | (2006.01) |
| *B29C 65/10* | (2006.01) |
| *B29C 65/16* | (2006.01) |
| *B29C 65/62* | (2006.01) |
| *B29C 65/02* | (2006.01) |
| *B29C 65/52* | (2006.01) |
| *B29K 23/00* | (2006.01) |
| *B29K 67/00* | (2006.01) |
| *B29K 77/00* | (2006.01) |

(52) U.S. Cl.
CPC .............. *B29C 65/02* (2013.01); *B29C 65/08* (2013.01); *B29C 65/10* (2013.01); *B29C 65/16* (2013.01); *B29C 65/486* (2013.01); *B29C 65/5028* (2013.01); *B29C 65/5035* (2013.01); *B29C 65/522* (2013.01); *B29C 65/62* (2013.01); *B29C 66/0384* (2013.01); *B29C 66/21* (2013.01); *B29C 66/919* (2013.01); *B29C 66/929* (2013.01); *B29C 66/949* (2013.01); *B29K 2023/0683* (2013.01); *B29K 2067/003* (2013.01); *B29K 2077/00* (2013.01); *B29K 2995/0006* (2013.01); *B32B 2262/0253* (2013.01); *B32B 2262/0261* (2013.01); *B32B 2262/0276* (2013.01); *B32B 2307/204* (2013.01)

(56) References Cited

U.S. PATENT DOCUMENTS

| | | |
|---|---|---|
| 2005/0181168 A1 | 8/2005 | Barnes et al. |
| 2010/0003452 A1 | 1/2010 | Jongedijk et al. |
| 2013/0220195 A1* | 8/2013 | Sjostedt ............ B32B 5/10 114/102.3 |
| 2014/0259251 A1 | 9/2014 | Moore et al. |

* cited by examiner

METHOD OF BONDING FIBERS TO FORM A COMPOSITE STRUCTURE

BACKGROUND

Technical Field

The present disclosure generally relates to methods of bonding fibers and, more specifically, to methods of bonding Ultra-High Molecular Weight Polyethylene (UHMWPE) fibers and fiber-reinforced laminates having the UHMWPE fibers and to the resulting composite structure.

Description of the Related Art

Cuben fiber is a fiber-reinforced laminate that is a nonwoven fabric. Cuben fiber has many material property advantages, notably, its weight to strength ratio. This makes it a prime material for aerospace and mountaineering applications that require complex shapes while keeping weight to a minimum. Cuben fibers are typically produced using Ultra-High Molecular Weight Polyethylene (UHMWPE) fibers, such as the DYNEEMA® material, with polyester or fluoride films.

DYNEEMA® is a registered trademark of the manufacturer DSM Dyneema. The DYNEEMA® material is a super-strong fiber made from UHMWPE having long molecular chains that transfer load more effectively to the polymer backbone and this fiber layer gives Cuben fiber its strength. DYNEEMA material is produced in a gel spinning process in which the UHMWPE fibers are drawn, heated, elongated, and cooled. For example, UHMWPE is added into a suitable solvent and spun through a spinnerette. Then, it is cooled, extracted, dried, and extended, to produce the final fibers. Unlike normal polyethylene having low orientation, low molecular weight, and low crystallinity, DYNEEMA® material has very high molecular orientation, high molecular weight, and high crystallinity.

BRIEF SUMMARY

The present disclosure provides new and innovative methods of bonding fibers. An example method includes providing a first fiber layer and a second fiber layer positioned below the first fiber layer. The first and second fiber layers are bonded to each other. The method also includes providing a first additive layer and activating the first additive layer by directing energy at the first additive layer. In some implementations, the directing of the energy may bond the first and second fiber layers to each other. The energy directed to the first additive layer is one or more of radio-frequency energy, heat energy, ultrasonic energy, or laser energy. In some implementations, the first additive layer is located between the first fiber layer and the second fiber layer. In some implementations, at least one of the first and second fiber layers is a Cuben fiber layer. The Cuben fiber layer is made from UHMWPE fibers, such as DYNEEMA® fibers. In other implementations, at least one of the first and second fiber layers is a UHMWPE fiber layer.

The method may also include providing a second additive layer above the first fiber layer and a third additive layer below the second fiber layer. The first, second, and third additive layers are made from at least one of polyester and polyamides. The method may also include providing a buffer layer below the third additive layer. The buffer layer is made from plastic sheet material.

Another example method includes providing a first Cuben fiber layer and a second Cuben fiber layer below the first Cuben fiber layer. The method also includes providing a first additive layer and activating the first additive layer by directing energy at the first additive layer. In some implementations, the directing of the energy may bond the first and second fiber layers to each other.

In accordance with another aspect of the present disclosure, a composite structure is provided using the methods described herein.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
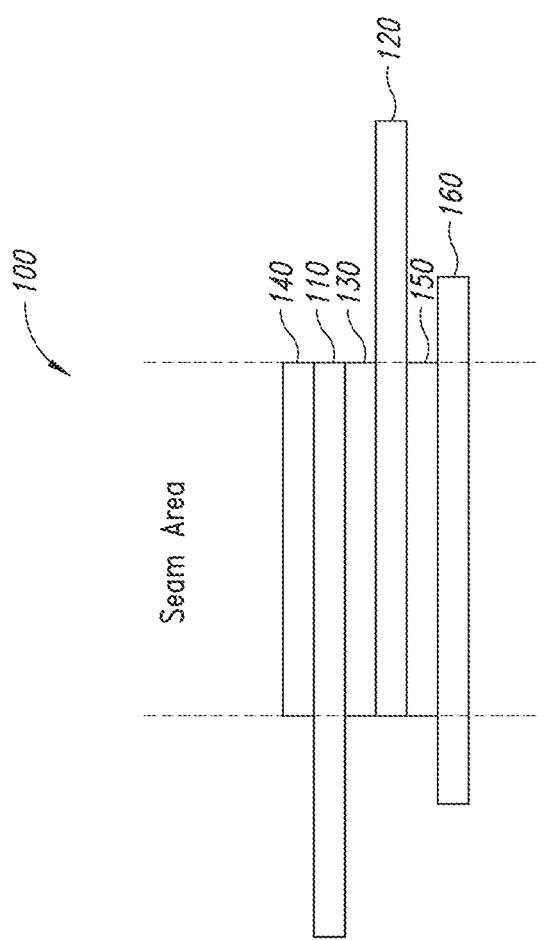
FIG. 1 is a cross-sectional view of the seam area according to an example method of the present disclosure.

In the following description, certain specific details are set forth in order to provide a thorough understanding of various disclosed implementations. However, one skilled in the relevant art will recognize that implementations is practiced without one or more of these specific details, or with other methods, components, materials, etc. In other instances, well-known structures or components or both associated with welding apparatus, RF welders, fiber construction, and the like have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics are combined in any suitable manner in one or more implementations.

Described herein are methods of bonding fibers and the resulting composite structure. As discussed above, Cuben fiber is a fiber-reinforced laminate, produced using Ultra-High Molecular Weight Polyethylene fibers, such as the DYNEEMA® material, with polyester or fluoride films. However, the Ultra-High Molecular Weight Polyethylene fibers (such as DYNEEMA®) have a low melting point of around 250° F. Furthermore, prolonged exposure to temperatures above 180° F. is going to compromise the integrity of the fibers.

Due to the low melting point of the UHMWPE fibers, attempts to bond the Cuben fiber to itself via traditional fabric welding methods such as radio frequency (RF), ultrasonic, laser welding/laser enhanced bonding (LW/LEB), and hot-air welding (HA) have been unsuccessful, resulting in heat damage to the UHMWPE fibers. Ultimately, the process produces a bond that fails and tears at the edge of the weld seam. Currently, the accepted method for working with Cuben fiber is to sew and tape the seams. This process may work for some applications, but falls short when a strong, airtight seam is required.

Aspects of the present disclosure address the above-noted deficiency by providing a method of bonding UHMWPE fibers and fiber-reinforced laminates having the UHMWPE fibers, such as Cuben fibers, by providing an additive layer made from polyester or polyamides (nylon) to the seam area. It has surprisingly been found that the use of this additive layer during the bonding process unexpectedly enables the bonding of UHMWPE fibers or fiber-reinforced laminates or both with minimal heat damage. The polyester or polyamides, alone or in any combination, is added to the top, middle, or bottom of the Cuben fibers to be bonded. It is added to all three sides (top, middle, bottom) or only two sides (e.g., top-middle, middle-bottom, top-bottom) of the Cuben fibers. A buffer layer, such as plastic sheet material, is also added. In this way, aspects of the present disclosure may offer a bond that has minimal damage to the UHMWPE fibers, and ultimately to the Cuben fibers during the bonding process.

FIG. 1 depicts a cross-sectional view of the seam area 100 according to an example method of the present disclosure. The seam area 100 includes a first fiber layer 110 and a second fiber layer 120. In some implementations, at least one of the first and second fiber layers 110-120 is a Cuben fiber layer. The Cuben fiber layer is preferably made from UHMWPE fibers, such as DYNEEMA® fibers. In other implementations, at least one of the first and second fiber layers 110-120 is a UHMWPE fiber layer. In other implementations, the first fiber layer 110 is a Cuben fiber layer and the second fiber layer 120 is a UHMWPE fiber layer. In some implementations, the second fiber layer 120 located below the first fiber layer 110.

The seam area 100 may also include a first additive layer 130. In some implementations, the first additive layer 130 is located between the first and second fiber layers 110-120. For example, the first additive layer 130 is placed on the bottom surface of the first fiber layer 110 and on the top surface of the second fiber layer 120. In other implementations, the first additive layer 130 is added to the top of the first fiber layer 110 or to the bottom of the second fiber layer 120. For example, the first additive layer 130 is placed on the top surface of the first fiber layer 110 or on the bottom surface of the second fiber layer 120. The first additive layer is preferably made from polyester or polyamides (nylon). The polyester or polyamides have a higher melting point than UHMWPE, such as DYNEEMA® fibers. The polyester or polyamides is in essentially any form, such as fiber, flock, pellet, and powder. In some implementations, the polyester or polyamides is in the form of glue.

In some implementations, the seam area 100 may also include a second additive layer 140. The first and second additive layers 130-140 are added to two sides (e.g., top-middle, middle-bottom, top-bottom) of the first and second fiber layers 110-120. The second additive layer 140 is preferably made from polyester or polyamides (nylon).

In some implementations, the seam area 100 may also include a third additive layer 150. In this case, the first, second, and third additive layers 130-150 are added to all three sides (top, middle, bottom) of the first and second fiber layers 110-120. For example, the first additive layer 130 is located between the first and second fiber layers 110-120, the second additive layer 140 is placed above the first fiber layer 110, and the third additive layer 150 is placed below the second fiber layer 120. The third additive layer 150 is preferably made from polyester or polyamides (nylon). In some implementations, the polyester and polyamides used for the first, second, and third additive layers are coated with thermoplastic polyurethane (TPU). The first, second, and third additive layers are applied to the first fiber layer or the second fiber layer or to both using known application techniques, such as immersion, knife coating, transfer coating or placing precut pieces of the additive layers to the area intended to be welded.

In some implementations, the seam area 100 may further include a buffer layer 160. In some implementations, the buffer layer 160 is a bottom layer of the seam area 100. For example, if the seam area 100 includes a first fiber layer 110, a second fiber layer 120 below the first fiber layer 120, and a first additive layer between the first fiber layer 110 and the second fiber layer 120, the buffer layer 160 is placed below the second fiber layer 120. If the seam area 100 includes first and second fiber layers 110-120 and first, second, and third additive layers 130-150 on three sides (top-second additive layer 140, middle-first additive layer 130, and bottom-third additive layer 150) of the first and second fiber layers 110-120, the buffer layer 160 is placed below the third additive layer 150. In other implementations, the buffer layer 160 is a top layer of the seam area 100. In some implementations, the buffer layer 160 is made from plastic sheet material or polyester film, such as MYLAR® material. MYLAR® material is a specific family of plastic sheet products made from the resin Polyethylene Terephthalate (PET), which is produced by DuPont Teijin Film™.

A variety of bonding techniques is utilized to form the bond between the first fiber layer 110 and the second fiber layer 120, including radio frequency (RF) bonding, ultrasonic bonding, hot-air welding, and laser welding/laser enhanced bonding (LW/LEB). Radio frequency (RF) bonding, also known as dielectric bonding, uses RF energy to bond materials. RF electrodes deliver the RF energy to the materials being joined and this causes the molecules to oscillate, creating heat in the materials. Ultrasonic bonding uses ultrasonic energy to create heat by directing high-frequency vibrations to the materials being joined under pressure. Laser welding and laser enhanced bonding are bonding techniques used to join multiple pieces of materials through the use of a laser and laser energy, respectively. Hot-air welding uses heat energy to bond materials by directing precise heat and pressure to the seam area. Examples of the bonding process using a radio frequency bonding technique are described in greater detail below in connection with FIG. 2.

Figure 2:
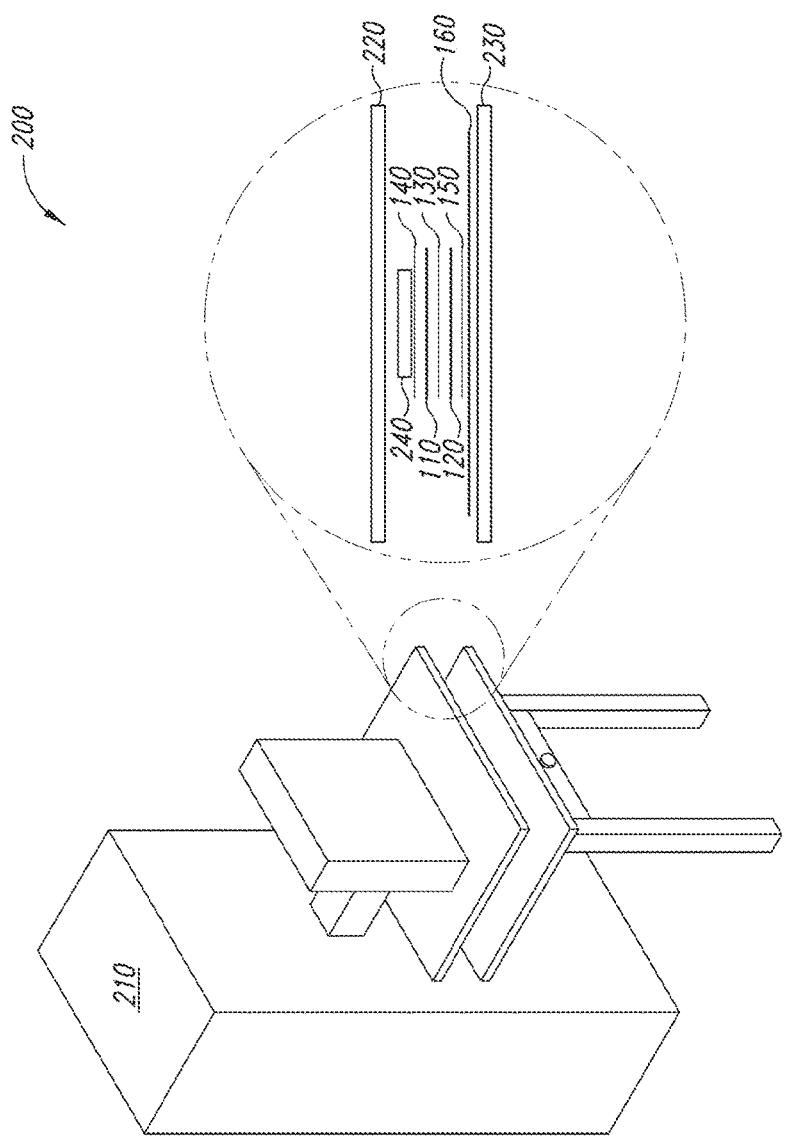
FIG. 2 is a diagram that illustrates an example method to radio-frequency bond fibers according to an example method of the present disclosure.

FIG. 2 is a diagram that illustrates an example method of bonding fibers using a RF bonding technique according to one implementation of the present disclosure. Unless otherwise explicitly noted or described, the seam area illustrated in FIG. 2 can include similar or the same components as those of the seam area 100 illustrated in FIG. 1.

In some implementations, the RF welder 210 may include an upper platen 220 and a lower platen 230. The upper and lower platens 220-230 is an RF electrode configured to transfer RF energy to the seam area 100. In some implementations, the RF welder 210 may also include a shaped die 240. In RF bonding, the upper and lower platens 220-230 may contact and compress the seam area 100. The upper and lower platens 220-230 may transfer the RF energy to the seam area 100 such that the seam area 100 is activated/exposed to a certain level of RF energy for a predetermined period of time. As the RF energy is absorbed by various layers of the seam area 100 (e.g., the first fiber layer 110, the second fiber layer 120, and/or the first additive layer 130), the temperature of the seam area may rise until melting/semi-melting occurs at the seam area 100. In some implementations, the melting/semi-melting may occur at the interface between the first and second fiber layers 110-120 or at the interface between first additive layer 130 and the first/second fiber layers 110-120. Once the molten material is intermixed, the seam area is cooled off to form a bond between the first fiber layer 110 and the second fiber layer 120.

Remaining features and characteristics of the seam area 100 illustrated and described with respect to FIG. 2 can otherwise be similar or the same as those described with the implementations depicted in FIG. 1, including, but not limited to, characteristics of certain layers and the possible presence of the layers, such as the first and second fiber layers 110-120, the first, second, and third additive layers 130-150, and the buffer layer 160 as described and illustrated herein. For example, the seam area may also include a buffer layer 160. Due to the poor dielectric property of Cuben fibers, Cuben fibers could catch on fire during the RF bonding process. It has surprisingly been found that the plastic sheet material or polyester film (e.g., MYLAR®) unexpectedly acts as a buffer layer such that the likelihood of setting Cuben fibers on fire during the RF bonding process could be drastically decreased.

Figure 3:
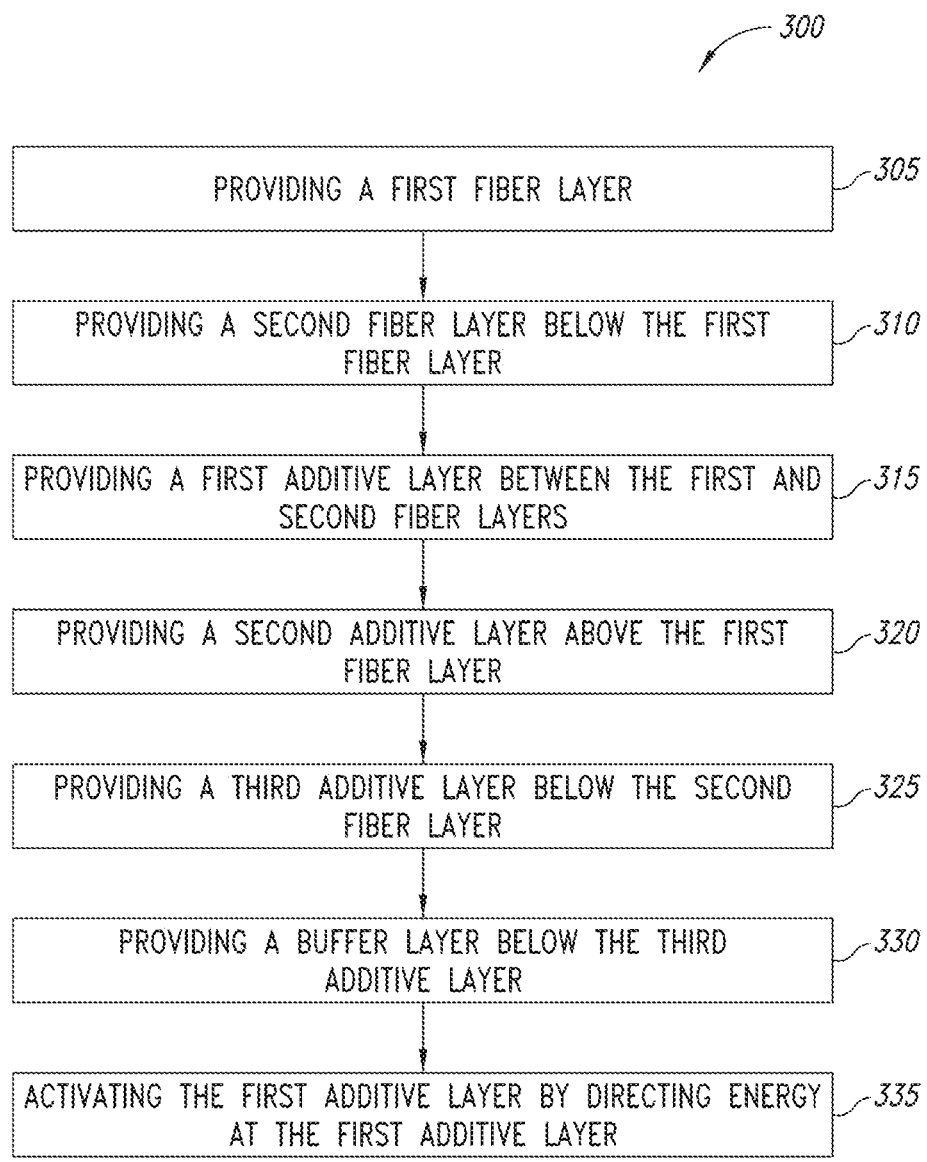
FIG. 3 is a flowchart illustrating an example method of bonding fibers.

FIG. 3 shows a flowchart of an example method of bonding fibers. Although the example method 300 is described with reference to the flowchart illustrated in FIG. 3, it will be appreciated that many other methods of performing the steps associated with the method may be used. For example, the order of some of the blocks or steps is changed, certain blocks or steps are combined with other blocks or steps, and some of the blocks or steps so described are optional.

In the illustrated example, the method 300 includes providing a first fiber layer and a second fiber layer below the first fiber layer (blocks 305 and 310). In some implementations, at least one of the first and second fiber layers is a Cuben fiber layer. In other implementations, at least one of the first and second fiber layers is a UHMWPE fiber layer, such as the DYNEEMA® material. The method 300 may also include providing a first additive layer between the first and second fiber layers (block 315). Then, the method 300 may further include providing a second additive layer above the first fiber layer and a third additive layer below the second fiber layer (blocks 320 and 325). The first, second, and third additive layers are made from polyester or polyamides (nylon). The method 300 may include providing a buffer layer below the third additive layer (block 330). In some implementations, the buffer layer 160 is made from plastic sheet material or polyester film, such as MYLAR® material. Subsequently, the method 300 includes activating the first additive layer by directing energy at the first additive layer (block 335). The energy directed to the first additive layer is radio-frequency energy, heat energy, ultrasonic energy, or laser energy.

The various implementations described above can be combined to provide further implementations. Aspects of the implementations can be modified, if necessary to employ concepts of the various patents, applications and publications to provide yet further implementations.

Figure 4:
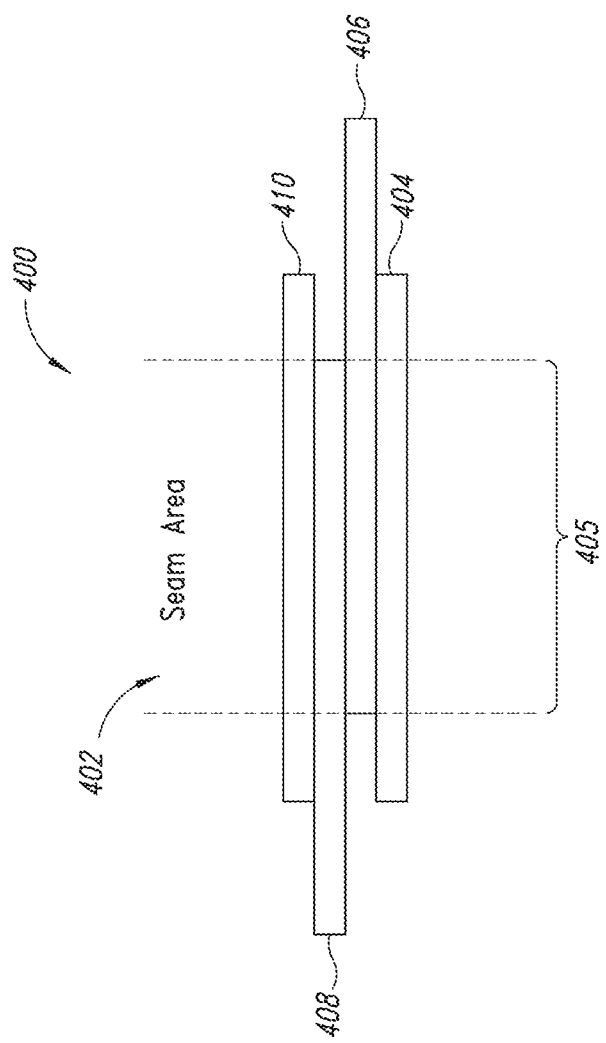
FIG. 4 is a cross-sectional view of a composite structure formed in accordance with an alternative implementation of the present disclosure.

For example, FIG. 4 illustrates a different method 400 and resulting composite structure 402 in which the additive layers described above are omitted. Here, the composite structure 402 is in the form of a seam 405 that includes a first buffer layer 404, an adjacent first fiber layer 406, then an adjacent second fiber layer 408, and a final adjacent second buffer layer 410. It is to be understood that the first and second buffer layers 404, 410 may be formed from material as described above or any non-dielectric buffer. Accordingly, the steps of the method described above would be modified to eliminate the use of the additive layers. While only two fiber layers are described above, it is to be understood that more layers can be seamed together, including 3, 4, 5, 6, and up to 10 layers using the techniques described herein.

When using the RF welder with this implementation of the disclosure, the two fiber layers are positioned between the upper and lower platens on the RF welder. The following specifications for the RF welder are provided by way of non-limiting example. Generally, the weld time would be 3 to 8 seconds (inclusive of the outer range numbers), with the current set at 5 to 12% of the machine's power (assuming a 10 kW machine is used), and the pressure would be around 80 PSI. The time to cool under pressure would be about 5 to 8 seconds (inclusive of the outer range numbers).

In accordance with another aspect of the present disclosure, it is possible to combine these layers using spot welding techniques. In addition, one could use a dielectric modifier in connection with the fiber layers to match the spot welding. Dielectric modifiers are materials with an electrical insulator that can be polarized by an applied electric field. Examples of dielectric modifiers include, but are not limited to, Barex 210; Barex 218; PETG (Polyethylene Terphthatate Glycol); Pliofilm (Rubber Hydrochloride); Polyvinyl chloride (PVC); Polyvinyl chloride (PVC) (adhesive emulsions); Saran (Polyvinylidene Chloride); ABS polymers; APET; PET (Polyethylene Terphthatate); Polyurethane-vinyl film; or other dielectric materials.

In the spot application process, a first dielectric modifier is applied to first specific area of a first layer of high-strength fibrous material. A second dielectric modifier is then applied to a second specific area of a second layer of high-strength fibrous material. The first and second dielectric modifiers may be the same or different modifier material. The first and second layers of high-strength fibrous material may be the same or different fibrous material.

The first and second specific areas of the fibrous material are positioned at a seam location defined by where the first dielectric modifier and the second dielectric modifier abut and mirror each other, and in which the first layer and the second layer of fibrous material are on the outside of the seam. Energy is applied to the seam to activate the first and second dielectric modifier, which in turn forms a bond between the first and second layers of high-strength fibrous material. The energy may be one or more of radio-frequency energy, heat energy, ultrasonic energy, or laser energy. Although the foregoing method describes the bonding of two layers of high-strength fibrous materials, additional layers of high-strength fibrous materials may be bonded in a similar way. For example, a dielectric modifier is added to each layer of high-strength fibrous material with the dielectric modifiers overlapping when the energy is applied to the seam.

The process of applying the dielectric modifier to a specific area of the high-strength fibrous material can be carried out by a variety of methods, including but not limited to laminate with heat or utilization of an adhesive or a heated pressure element, extruded and applied as glue, or sprayed on.

In some implementations, an additional dielectric enhancer layer may be posited between the two layers of spot coated high-strength fibrous material to accelerate the energy transfer and allow the dielectric modifier to create a stronger weld or bond to the high-strength fibrous material. The dielectric enhancer layer may be made out of Nylon (Polyamide); Polyamide; Polyurethane; PVC rigid; Rubber, compounded; Polyester; Polymide or other dielectrics.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of bonding Dyneema fiber material to itself to form an airtight seam, comprising:
    providing a first fiber layer consisting of an Ultra-High Molecular Weight Polyethylene (UHMWPE) Dyneema fiber, the first fiber layer having a first side and a second side;
    providing a second fiber layer consisting of a UHMWPE Dyneema fiber having a first side and a second side and positioning the second fiber layer to have the first side facing the second side of the first fiber layer;
    overlapping a portion of the second side of the first fiber layer and a portion of the first side of the second fiber layer to create a seam;
    providing a thermal buffer layer against the first side of the first UHMWPE Dyneema fiber layer or against the second side of the second UHMWPE Dyneema fiber layer, or both, in the seam; and
    forming a composite structure at the seam by RF welding the first and second UHMWPE Dyneema fiber layers and the thermal buffer layer together to form an airtight seam.

2. The method of claim 1, comprising providing a first additive layer adjacent to the first side of the first fiber layer.

3. The method of claim 2, further comprising providing a second additive layer adjacent the second side of the second UHWMPE Dyneema fiber layer.

4. The method of claim 3, further comprising providing a third additive layer between the first UHWMPE Dyneema fiber layer and the second UHWMPE Dyneema fiber layer prior to forming the composite structure.

5. The method of claim 4, wherein the first, second, and third additive layers are made from at least one of polyester and polyamides and the thermal buffer layer consists of Mylar material.

6. The method of claim 1, wherein the RF welding comprises applying RF energy to the seam in a range from 3 seconds to and including 8 seconds with current set at 5 to 12% of 10 kW and pressure applied to the seam of 80 PSI, with a time to cool under pressure in a range from 5 seconds to and including 8 seconds.

7. A method for bonding Ultra-High Molecular Weight Polyethylene (UHMWPE) Dyneema fiber to itself with an airtight seam, the method comprising:
    providing a first UHMWPE Dyneema fiber layer having a first side and a second side;
    providing a second UHMWPE Dyneema fiber layer having a first side and a second side and positioning a portion of the first side of the second UHMWPE Dyneema fiber layer adjacent a portion of the second side of the first UHMWPE Dyneema fiber layer to form a seam area;
    providing a thermal buffer layer on the first side of the first UHMWPE Dyneema fiber layer or on the second side of the second UHMWPE Dyneema fiber layer in the seam area, or both the first side of the first UHMWPE Dyneema fiber layer and on the second side of the second UHMWPE Dyneema fiber layer in the seam area, the thermal buffer layer consisting of a silicone or polyester film; and
    directing energy at the seam area to bond together the portions of the first and second UHMWPE Dyneema fiber layers and the thermal buffer layer to form an airtight seam.

8. The method of claim 7, comprising providing a first additive layer between the first side of the second UHMWPE Dyneema fiber layer and the second side of the first UHMWPE Dyneema fiber layer prior to forming the airtight seam.

9. The method of claim 8, further comprising providing a second additive layer against the second side of the second UHMWPE Dyneema fiber layer prior to forming the composite structure.

10. The method of claim 9, further comprising providing a third additive layer against the first side of the first UHMWPE Dyneema fiber layer prior to forming the airtight seam.

11. The method of claim 10, wherein the first, second, and third additive layers are made from at least one of polyester and polyamides.

12. The method of claim 11, wherein the energy consists of radio-frequency energy applied to the seam area in a range from 3 seconds to and including 8 seconds with current set at 5 to 12% of 10 kW and pressure applied to the seam area of 80 PSI with a time to cool under pressure in a range from 5 seconds to and including 8 seconds.

13. The method of claim 7, wherein the thermal buffer layer comprises Mylar material.

* * * * *